United States Patent Office 2,931,385
Patented Apr. 5, 1960

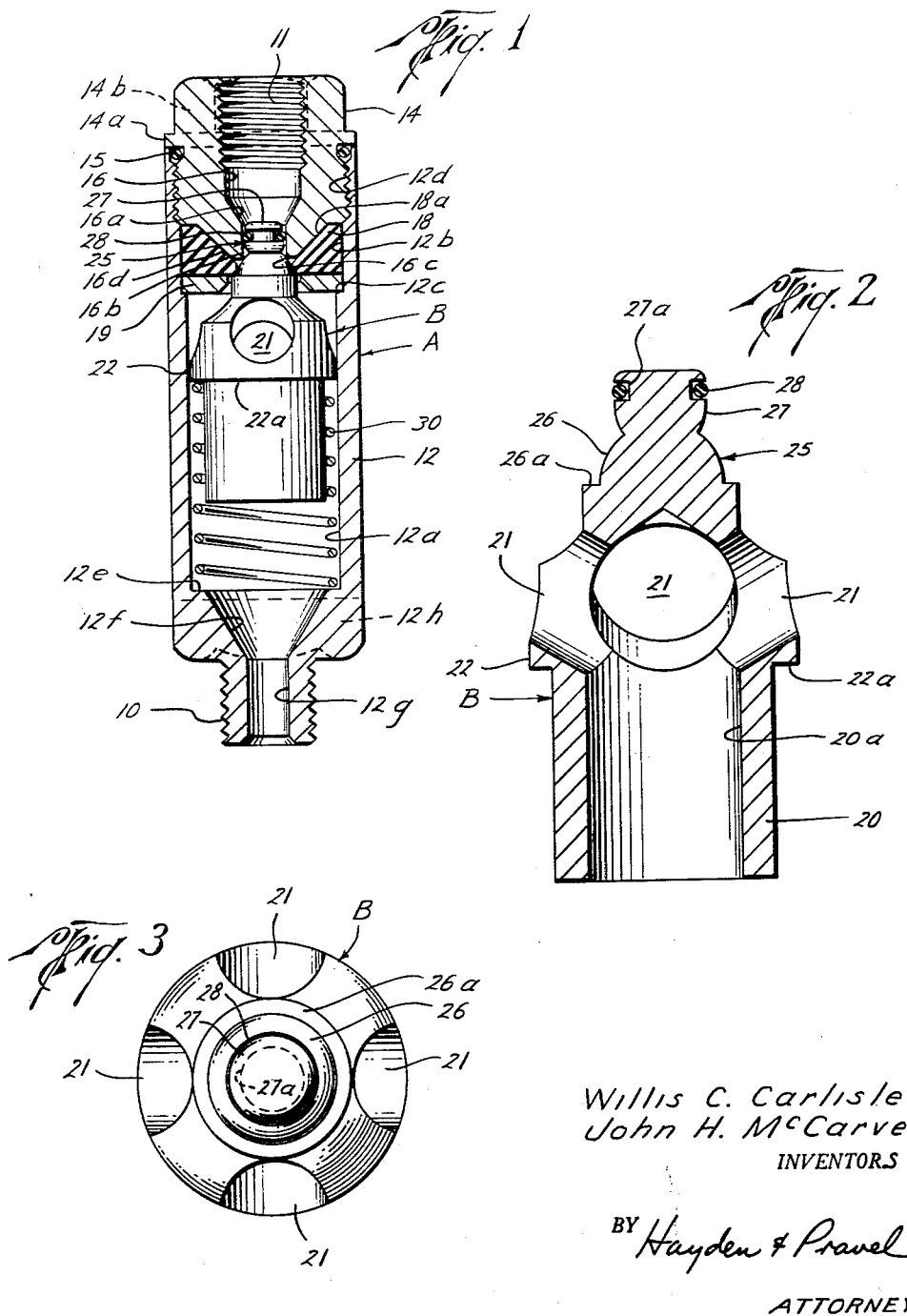

2,931,385
ANTI-SCORING CHECK VALVE
Willis C. Carlisle and John H. McCarvell, Houston, Tex.
Application October 31, 1956, Serial No. 619,622
1 Claim. (Cl. 137—516.29)

This invention relates to new and useful improvements in check valves.

This invention is an improvement on the check valve disclosed in our U.S. Patent 2,670,922, granted March 2, 1954.

An object of this invention is to provide a new and improved check valve having all of the advantages of the check valve disclosed in said Patent No. 2,670,922, and in addition thereto, including another sealing construction for sealing off fluid flow through the valve when the valve is in the closed position.

Another object of this invention is to provide a valve for extremely high pressures, wherein the valve has a triple sealing construction for closing off fluid flow through the valve so that sealing of the valve is assured even though one, or even two, of the seals becomes defective or fails to function.

A further object of this invention is to provide a new and improved valve construction which includes a valve member having a replaceable resilient seal ring adapted to fit within the bore of the valve body for sealing contact therewith and also a curved metallic annular seal surface for sealing with a valve seat at one end of the bore, whereby a multiple seal is provided with the valve member.

Still another object of this invention is to provide a new and improved valve construction which is particularly suitable for use in controlling high pressure fluids, wherein the valve member thereof is formed with a resilient replaceable seal and a curved annular seal, both of which function to close off fluid flow through the valve, but the resilient seal initially closing off the fluid flow prior to the seating of the curved annular seal so that the replaceable resilient seal is subjected to substantially all of the wear during normal use while at the same time providing the curved annular seal for closing off the valve when the resilient seal fails and prior to the replacement thereof.

The construction designed to carry out the invention will be hereinafter described, together with other features thereof.

The invention will be more readily understood from a reading of the following specification and by reference to the accompanying drawings forming a part thereof, wherein an example of the invention is shown, and wherein:

Fig. 1 is a view, partly in elevation and partly in section, illustrating the check valve of this invention;

Fig. 2 is an enlarged sectional view of the valve member used in the complete valve illustrated in Fig. 1;

Fig. 3 is a plan view of the valve member of Fig. 2.

In the drawings, the letter A designates generally the valve body of the check valve of this invention. A valve member B is mounted within the valve body A for movement relative thereto to thereby open and close fluid flow through the valve body A. The check valve of this invention may be used in any instance where it is desired to control fluid flow, but it is particularly suitable for use with high pressure fluids. For example, the check valve of this invention may be used with gas lift valves, an example of which is illustrated in United States Patent No. 2,610,644, granted September 16, 1952. The valve body A is provided with external threads 10 at one end thereof and internal threads 11 at the other end thereof for connection as desired with sources of fluid under pressure. The check valve illustrated in Fig. 1 may be used in the position shown therein, or in an inverted position.

Considering the invention more in detail, the valve body A includes a valve housing 12 and a valve plug 14. The valve housing 12 is hollow or tubular, and is preferably cylindrical. The bore 12a of the valve housing 12 is of substantially the same diameter throughout its length, except for the enlarged diameter portion 12b which is provided to form an annular lateral shoulder 12c within the valve housing 12. Internal threads 12d are also provided in the bore 12a adjacent one end thereof for receiving corresponding threads on the external surface of the plug 14. At the end of the valve housing 12 opposite from the plug 14, another annular lateral shoulder 12e is provided by a reduced diameter inclined or conical surface 12f which merges with a reduced diameter longitudinal opening 12g. The external threads 10 are formed on the valve housing 12 externally of the longitudinal opening 12g. To facilitate turning the valve housing 12 with a wrench or other tool, a plurality of flat sides or surfaces 12h (shown in dotted lines) are provided near the lower end of the body 12.

As previously stated, the plug 14 is provided with external threads which are adapted to engage in threaded relationship with the internal threads 12d within the valve housing 12 so as to removably attach the plug 14 to the housing 12 to form the complete valve body A. The plug 14 may be connected with the housing 12 with other known securing means so as to permit the removal thereof, but the construction illustrated in the drawings is preferred because it permits the ready removal of the plug 14 and the replacement thereof a number of times without damaging the parts. The plug 14 is formed with an annular flange 14a which is adapted to contact the end of the valve housing 12 adjacent the internal threads 12d. An O-ring 15 is formed of rubber or other similar sealing material is mounted on the plug 14 inwardly of the flange 14a for providing a fluid-tight seal between the plug 14 and the valve housing 12.

The exposed portion of the plug 14 is formed with a plurality of flat sides or surfaces 14b so that the plug 14 may be turned with a wrench or similar tool. The plug 14 has a longitudinal passage 16 extending therethrough, with the threads 11 formed in such passage 16 as shown in Fig. 1. Preferably, such passage 16 has an inclined or tapered portion 16a and a reduced diameter portion 16b adjacent the inner end of the plug 14. An annular valve seat 16c is provided at the inner annular edge or corner of the reduced diameter portion 16b of the longitudinal passage 16 for a purpose to be hereinafter described.

The plug 14 is also provided with an external inwardly inclined surface 16d which is adapted to receive in sealing contact therewith a resilient washer or sealing member 18 which has a correspondingly inclined annular surface 18a. The washer 18 may be made of rubber, synthetic resin, plastic or any other elastic resilient material. A retainer ring 19 which is preferably formed of metal or other relatively hard material is positioned in the valve housing 12 in contact with the annular lateral shoulder 12c so that when the plug 14 is threaded into its seated position (Fig. 1), the resilient washer 18 is confined between the ring 19 and the plug 14. Such construction prevents extrusion of the resilient washer 18 in any direction when engaged by the valve member B, as will be more evident hereinafter. The resilient washer 18 and the metal ring 19 may be formed in one piece and of the same material if desired, so long as there is a sealing surface for engaging with the valve member B. Thus, the metal ring 19 may in effect be eliminated by making the washer 18 extend to the annular shoulder 12c, but the construction illustrated is preferred. Actually, it is also possible to even eliminate the shoulder 12c, and in that case, the washer 18 would tend to float or move with the valve member B as it moves with respect to the valve housing 12.

The valve member B is a hollow plunger member having a hollow stem 20 with a longitudinal passage 20a. A plurality of inclined passages 21 are formed in the valve member B at one end of the longitudinal passage 20a. Such passages 21 are formed to one side of an annular guide surface 22 on the valve member B which contacts the bore or wall 12a in the valve housing 12 for guiding the longitudinal movement of the valve member B during the opening and closing of the valve. Since the guide surface 22 substantially contacts the bore or wall 12a of the valve housing 12, fluid flow around the valve member B is substantially cut off, but with the longitudinal passage 20a and the laterally extending openings 21, fluid communication from one side of the valve member B to the other side thereof is established. It should be noted that only one laterally extending passage 21 may be used, and such passage or passages need not be inclined, but the construction illustrated is preferred since the openings 21 provide for substantially the same area as the area provided by the longitudinal passage 20a, whereby no restriction to fluid flow through the valve member B occurs.

On the other side of the openings 21 from the hollow stem 20, the valve member B is formed with a valve head 25. Such valve head 25 includes an annular curved sealing surface 26 which is adapted to seat in sealing contact with the valve seat 16c. Such sealing surface 26 is preferably metal so that a metal to metal sealing contact is provided with the valve seat 16c. However, the entire valve head 25 may be formed of a different material than metal, or just the sealing surface 26 may be formed of a material other than metal. Such sealing surface 26 may be described as a segment of a ball since the curvature thereof conforms substantially to the segment of a ball, but in the usual case, the curved annular surface 26 is formed with a lathe.

The valve head 25 also includes a substantially cylindrical projection 27 which has an annular groove 27a formed in its external surface for receiving a resilient seal ring 28. The ring 28 is preferably an O-ring which is formed of rubber or other resilient material for sealing engagement with the wall of the longitudinal passage or bore 16d (Fig. 1) to thereby effect a closing off of fluid flow through the valve. The projection 27 may, of course, be formed in shapes other than cylindrical so long as the seal ring 28 is adapted to engage with the wall or bore 16d to close off fluid flow therethrough. The seal ring 28 projects laterally outwardly from the external surface of the projection or support 27 sufficiently to provide the only contact with the wall or bore 16d, whereby all of the wear occurs on the replaceable ring 28.

A resilient coil spring 30 is provided in the valve housing 12 for urging the valve member B to its closed position, wherein the seal ring 28 is in sealing contact with the wall or bore 16d, the curved annular surface 26 is in sealing contact with the valve seat 16c, and also the sealing surface 26 is in sealing contact with the resilient washer 18. It should also be noted that the annular lateral shoulder 26a adjacent the curved annular surface 26 may engage the resilient washer 18 to provide an additional sealing contact. In any event, the valve construction thus provides a triple sealing action in the closed position. The spring 30 rests upon the internal lateral shoulder 12e and engages with the lateral shoulder 22a so that such spring 30 is out of the normal fluid flow path through the valve. The strength of the spring 30 determines the amount of fluid force necessary to open the valve by moving the valve member B away from the plug 14. Thus, the strength of the spring 30 may be varied to suit particular pressure conditions.

In the operation or use of the check valve of this invention, the fluid, such as gas, under pressure acts in a direction to compress the spring 30 in order to open the valve for fluid flow therethrough. When the valve is in the open position, the seal ring 28 is positioned inwardly of the bore 16d so that it is out of sealing contact therewith. Also, the curved annular sealing surface 26 is out of contact with the annular valve seat 16c and the resilient washer 18. The fluid then flows through the longitudinal passage 16 and the reduced bore portion 16b thereof, around the valve head 25, then through the laterally extending openings 21, the longitudinal opening 20a and then outwardly through the longitudinal opening 12g.

When the fluid pressure acting in a direction with the spring 30 is sufficient together with the force of the spring 30 to overcome the fluid force on the opposite side of the valve member B therefrom, the valve member B is moved to the closed position. During such closing movement, the sealing ring 28 initially closes off the fluid flow through the valve so that substantially all of the wear occurs on the seal ring 28 during use rather than on the curved annular sealing surface 26 or the other parts of the valve. If the curved annular sealing surface 26 is used alone, there is a tendency to corrode or pit the surface 26 as the surface 26 approaches the valve seat 16c because the gas is then restricted to a very small area and flows at a relatively high rate. With the present construction, however, the fluid flow is closed off by the resilient seal ring 28 prior to the time that the curved annular metal surface 26 contacts the metal valve seat 16c. Also, the contact of the sealing washer 18 is effected at substantially the same time as the contact with the valve seat 16c so that both of such seals take place substantially simultaneously and subsequent to the sealing with the replaceable resilient seal ring 28. It can, therefore, be appreciated, that by reason of the present construction, the life of the check valve is materially increased because the O-ring 28 may be replaced when it becomes worn sufficiently to permit fluid flow to pass. Also, the sealing surface 26 is not subjected to any substantial amount of wear and neither are the other sealing parts of the valve, as compared to the seal ring 28, so their life is materially lengthened. Furthermore, when the seal ring 28 does become sufficiently worn to let fluid pass around same, the seals provided by the contact of the sealing surface 26 with the valve seat 16c and the sealing washer 18 still are available to prevent the flow of the fluid through the valve.

It should be pointed out that the valve body A may be formed with the plug 14 integral with the valve housing 12, and in such case the valve housing 12 would be separable at some intermediate point for the assembly of the valve member 12 and the other parts of the valve within the valve housing 12. However, the construction illustrated in the drawings is preferred because it enables the ready removal of the plug 14 from the valve housing 12. With the plug 14 thus removed from the valve housing 12, the sealing washer 18, the ring 19, the valve member B and the spring 30 may be removed from the housing 12. The repair or replacement of any of the parts is therefore facilitated. In order to replace the seal ring 28, it is only necessary to remove the plug 14 because the seal ring 28 is then exposed to permit the removal of the worn seal ring 28 and the replacement thereof with a new seal ring.

The foregoing disclosure and description of the invention is illustrative and explanatory thereof and various changes in the size, shape and materials, as well as in the details of the illustrated construction, may be made

What is claimed is:

A check valve suitable for use with high pressure fluids, including a tubular valve body having a longitudinal opening at each end thereof, at least one of said openings having a reduced diameter as compared to the internal diameter of the valve body, a valve member in said valve body, a spring surrounding said valve member and supporting said valve member for longitudinal movement in said body, said valve member including a seal ring mounted thereon for sealing contact with the internal wall of the longitudinal opening having the reduced diameter for thereby closing fluid flow through the valve body, the wall of the longitudinal opening of reduced diameter being substantially cylindrical and of the same diameter throughout its length, the internal diameter of said valve body being substantially cylindrical, said seal ring having a diameter substantially equal to the diameter of said longitudinal opening but smaller than the internal diameter of said valve body for sealing contact with the wall of said longitudinal opening when the seal ring is positioned in or moved into said longitudinal opening, but for instantaneous release from sealing contact when the seal ring moves out of the longitudinal opening into said valve body, the inner edge of the wall of said opening of reduced diameter serving as an annular valve seat, said valve member also having an annular curved sealing surface for contacting said valve seat to serve as an additional seal for closing fluid flow through the valve body, a resilient washer positioned in the valve body and interposed between the valve member and the end of the valve body having said longitudinal opening of reduced diameter for providing a third seal for closing fluid flow through the valve body.

References Cited in the file of this patent

UNITED STATES PATENTS

| | | |
|---|---|---|
| 2,445,505 | Ashton | July 20, 1948 |
| 2,661,925 | Barkelew | Dec. 8, 1953 |
| 2,670,922 | Carlisle | Mar. 2, 1954 |

FOREIGN PATENTS

| | | |
|---|---|---|
| 40,549 | Germany | Aug. 26, 1887 |